United States Patent
Nodfelt et al.

[11] Patent Number: 5,715,342
[45] Date of Patent: Feb. 3, 1998

[54] CONNECTOR FOR COUPLING FIBER OPTIC TRANSMISSION MEANS

[76] Inventors: Ingvar Nodfelt, Målaregården 8, S-240 21 Löddeköpinge, Sweden; Bernd Stanitz, Rosenstrasse 2, D-6622 Wadgassen, Germany

[21] Appl. No.: 649,948

[22] Filed: May 14, 1996

Related U.S. Application Data

[63] Continuation of Ser. No. 90,094, filed as PCT/SE92/00054 Jan. 29, 1992, Pat. No. 5,577,143.

[30] Foreign Application Priority Data

Jan. 30, 1991 [SE] Sweden ................................. 9100281

[51] Int. Cl.⁶ ...................................................... G02B 6/38
[52] U.S. Cl. ................................................. 385/61; 385/59
[58] Field of Search ......................... 385/53–56, 58–60, 385/61, 64, 71, 89, 79

[56] References Cited

U.S. PATENT DOCUMENTS

| | | | |
|---|---|---|---|
| 4,140,367 | 2/1979 | Makuch et al. | 350/96.22 |
| 4,217,030 | 8/1980 | Howarth | 385/64 |
| 4,252,406 | 2/1981 | Ryan, Jr. et al. | 385/59 X |
| 4,759,599 | 7/1988 | Yamaguchi et al. | 385/60 |
| 5,577,143 | 11/1996 | Nodfelt et al. | 385/61 |

FOREIGN PATENT DOCUMENTS

| 2195786 | 4/1988 | United Kingdom | 385/59 |
|---|---|---|---|

*Primary Examiner*—John D. Lee
*Attorney, Agent, or Firm*—Klarquist Sparkman Campbell Leigh & Whinston, LLP

[57] ABSTRACT

A multi channel connector for transmission means, preferably optical fiber ends, diodes or the like, equipped with lenses. The connector comprises two connector parts shaped for cooperation with at least one centering means for centering the transmission means. The centering means are respectively male and female shaped. The transmission means are each located in a related holder in both connector parts. Each holder has in limited extent radial mobility as well as axial mobility so that each holder is self-centering independent of the other holders.

10 Claims, 4 Drawing Sheets

CONNECTOR FOR COUPLING FIBER OPTIC TRANSMISSION MEANS

This is a continuation of application Ser. No. 08/090,094, filed as PCT/SE92/00054 Jan. 29, 1992 (now U.S. Pat. No. 5,577,143).

The present invention refers to a multi channel connector for coupling-up the end portions of opposing transmission means, such as perferably optical fiber ends, provided with lenses, diodes or the like. The connector includes two connector parts, shaped for cooperation with a male and a female centering means for each of the transmission means for coaxial guiding and fixation of each transmission means regardless of the other transmission means.

THE BACKGROUND OF THE INVENTION

Known multi channel connectors of above mentioned type require very high tolerances when manufacturing the closed parts, and then in particularly the case of the connector parts and linings, where the parallelism between the control hole for the transmission means to the optical fibers, the diode or the like, must be within 0.001 mm, as well as the control hole and guide-pin for centering of connector among themselves. Further, the right angle between the end-surfaces of the connector parts and the longitudinal axis of the guiding holes must lie within ±0.002 mm, as well as the partition between the control hole and the guide pin respectively.

In order not to let the transmission means be able to change position, these are fastened permanently in the case of the connector parts by means of, for example forced fit. This implies that if the transmission means should be defective, these can not be exchanged, but the whole multi channel connector must be discarded and replaced with a new one.

Through the German Patent Specification No. 2743626, it is known that a number of optical fibers can be coupled up by means of a connector device. A problem with this connector device is that the optical fibers consist of extremely thin fibres, with sizes of some micrometers. Because of this, it is extremely important that the centering is absolutely exact, since even very little deviations entails that the fiber ends lie side by, (ie., they are not coaxial). When a number of fibers are placed in one channel, as it is the case with the above-mentioned invention, a poor centering is obtained.

THE OBJECT OF THE INVENTION

The purpose of the present invention is to provide a connector of the type mentioned by way of introduction, where the high demands for exact centering of the fiber end portions are fulfilled with appreciable simpler and cheaper means than earlier, where an exchange of the connector part closed components, such as transmission means, is easily accomplished, and which connector is formed so that standard components present on the market can be used. Further, it is possible to place the end portions of the optical fibers and one or more LEDs, for cooperation with optical fibers, in one and same connector, and on one hand attain an accurate centering for all optical fibers and in the other hand attain that the holders consist of two connector parts, in coupled up position, with their end surfaces come to bearing on each other, which further improves the coaxiality.

These problems are solved by placing the transmission means in the both connector parts in each belonging holder, which to a limited extent has radial mobility as, by means of a spring, and axial mobility in each of connector parts arranged channels, so that each holder is self-centering regardless of the other holders.

DESCRIPTION OF THE DRAWINGS

The invention is explained hereinafter with reference to the enclosed drawings, which show an embodiment of the invention.

DESCRIPTION OF EMBODIMENTS

Figure 1:
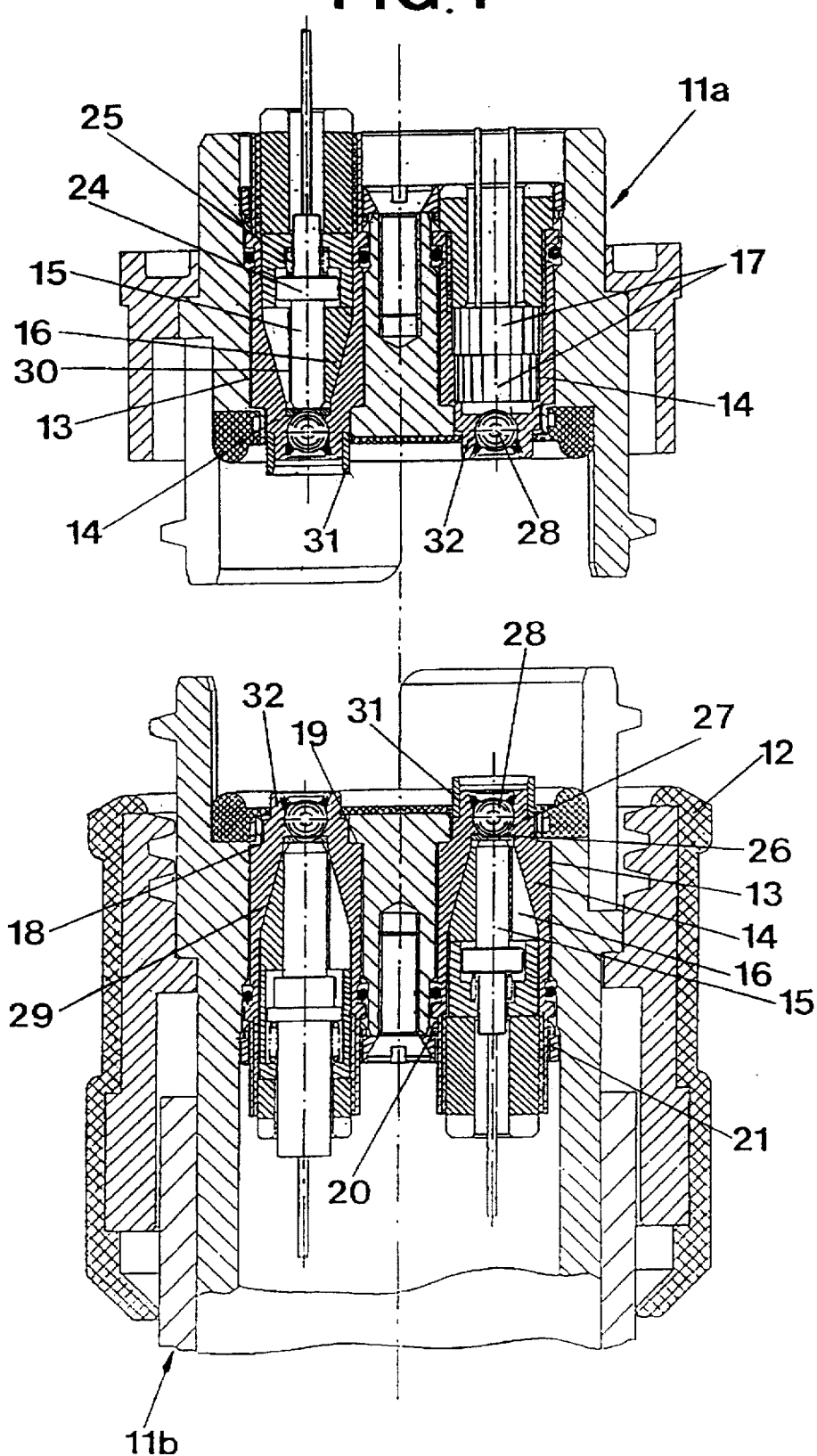
FIG. 1 shows in enlarged scale section through two connector parts of a multi channel connector, according to the invention, whereby both of the connector parts are slightly pulled apart from each other.
Figure 2:
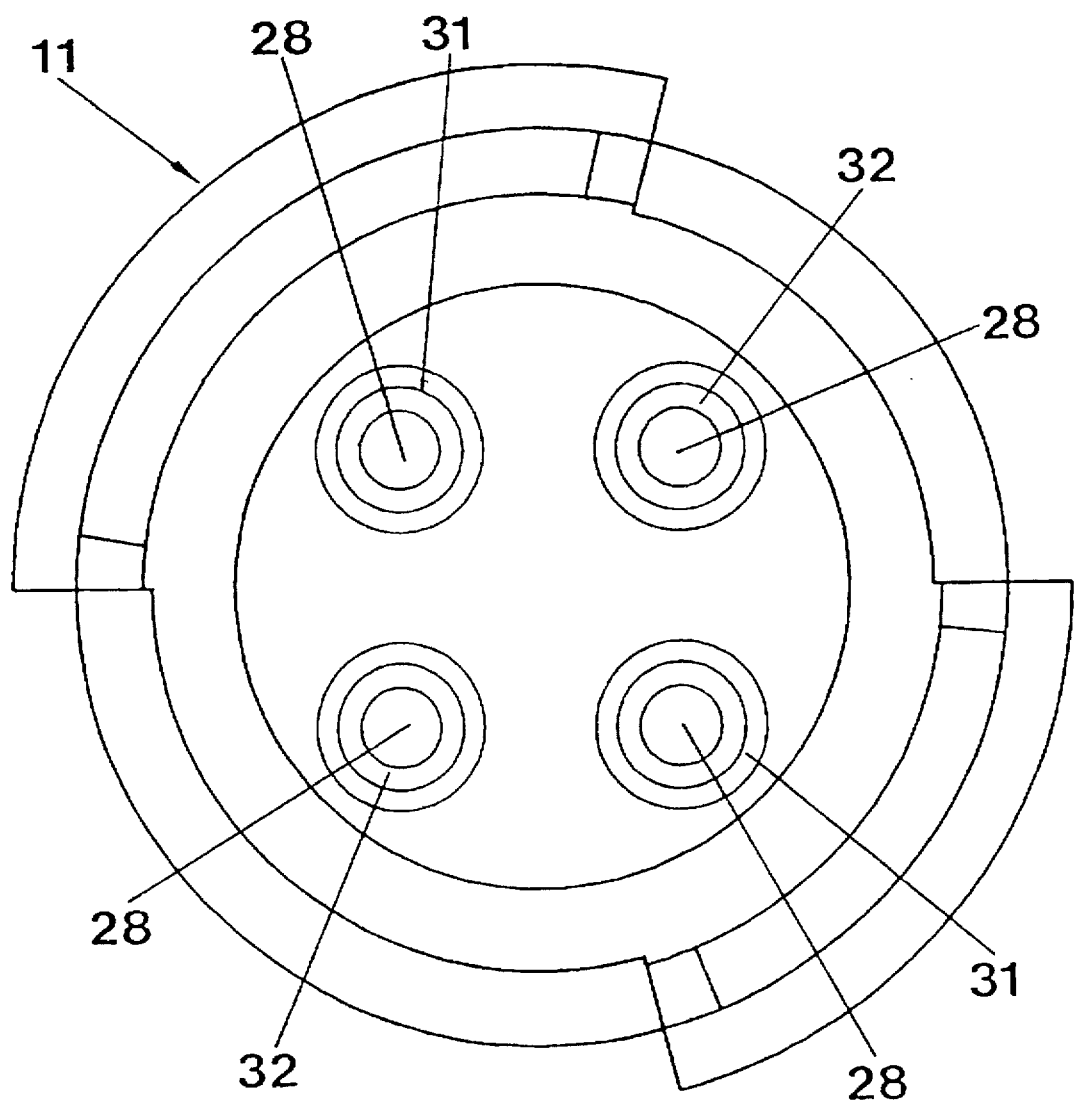
FIG. 2 shows a bottom view of one of the connector parts shown in FIG. 1.

The connector according to the invention consists of two connector parts 11a and 11b, which in a way previously known are insertable in each other and by means of a nut 12 fixable in their coupled-up position. Each connector part 11 is provided with a number of axial channels 13, in which a holder 14, with some play, is inserted for each transmission device 15, via a centering cone 16. The transmission means 15 can have the shape of a plug, in which the end portion of a optical fiber is situated so that the end-surface of the fiber coincides with one front end-surface of the plug. The transmission means 15 can also be a transmitter or a receiver for a diode 17.

The holder 14 is provided with a shoulder 18, which bears on a corresponding ledge 19 in the channel 13. The holder 14 is kept in its inserted position by means of a spring 20, which rests against a pressable holder-on 21, which is screwed-on by the connector part's posterior end surface. Thus it is possible, by means of the spring 20, to axially displace the holder 14 within the channel 13. In addition, the play between the holder and the channel is enough that the holder can perform a limited radial motion.

Figure 4:
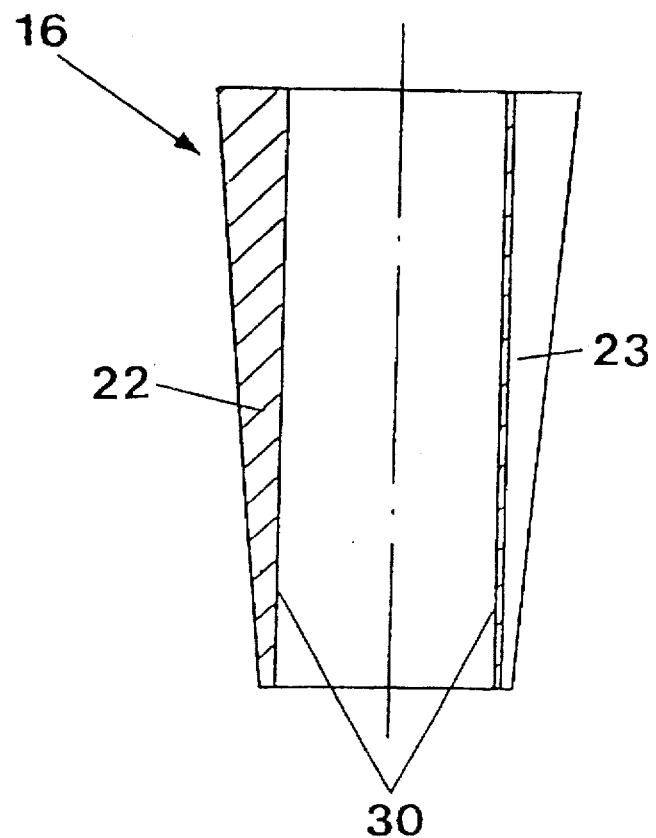
FIG. 4 shows a section along the line IV—IV in FIG. 3.
Figure 3:
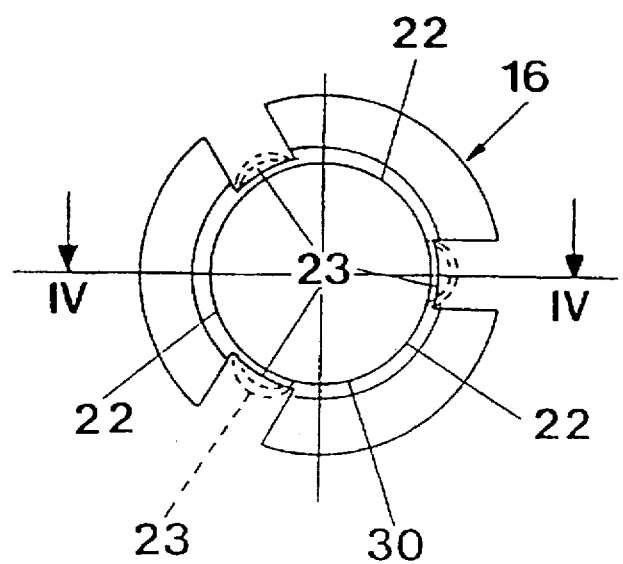
FIG. 3 shows a bottom view of a centering-cone, contained in the holder.
Figure 5:
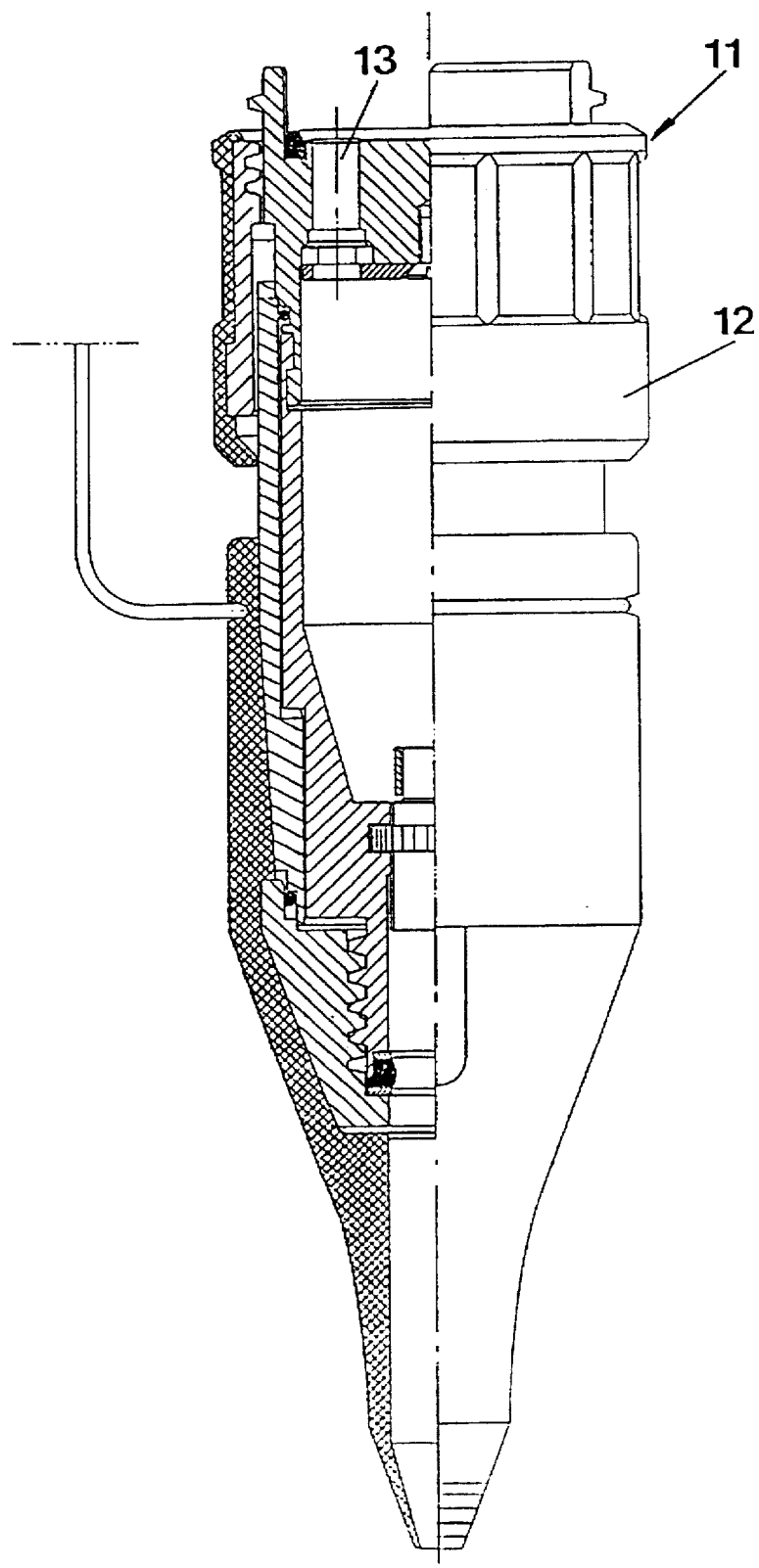
FIG. 5 shows, partly in section, a complete housing of a multi channel connector, but without a holder and a transmission means.

The transmission mean 15 is centered in the holder 14 with the centering-cone 16, the conic form of which corresponds the conical outlet 30 of the socket formed holder 14. Even the centering-cone has the shape of a socket and is provided with elastic sectors 22, consisting of material-reduced axial portions 23, which is apparent from the FIGS. 3 and 4. The inner outlet 31 of the centering-cone is shaped in accordance to external form of the transmission means, ie., it has cylindrical form. Further, the transmission means 15 is provided with a peripheral flange 24, which forms the contact surface for a compression spring 25, the purpose of which is to press the forward end-surface of the transmission means to bear on an opening 26 in a seat 27, which is provided at the front end of the holder 14. The seat 27 takes up a lens 28, the center axis of which coincides with the central longitudinal axis of the transmission means 15.

In the joined position of the connector parts 11a, 11b, one of the connector parts 11a of the transmission means 15 will be positioned right opposite to a corresponding transmission means 15 in the other connector part 11b, and to accomplish an exact coaxial coupling-up between the transmission means 15 in the both connector parts 11a and 11b, in one of the connector parts, for example 11b, the holders 14 upper end portion is provided with a guide-sleeve 31, which by means of forced-fit is permanently attached to the holder. The other holder 14 of the connector part 11a does not have a similar guide-sleeve, but it is however formed with a guide 32, which working-fit can be inserted in the guide-sleeve 31, so that the both holders with their transmission means 15 will be situated in exact coaxial position. Each individual holder 14 with transmission means 15 can consequently independently of the other holders in same coupling part be centered relative the opposing transmission means in the other holder, which is possible by the holders being not rigidly fixed in each coupling part, but having a certain radial as well as axial mobility.

| | Reference designations |
|---|---|
| 11a,b | connector parts |
| 12 | nut |
| 13 | channel |
| 14 | holder - cylindric socket |
| 15 | transmission means |
| 16 | centering-cone |
| 17 | diode |
| 18 | shoulder |
| 19 | ledge |
| 20 | spring |
| 21 | holder-on |
| 22 | elastic sectors |
| 23 | material-reduced axial parts |
| 24 | peripheral flange |
| 25 | compression spring |
| 26 | opening |
| 27 | seat |
| 28 | lens |
| 29 | conical outlet in the holder |
| 30 | cylindrical outlet in the centering-cone |
| 31 | guide-sleeve |
| 32 | guide |

We claim:

1. A multi-channel connector for coupling first and second fiber optic transmission means comprising:
   a pair of mating connecting parts, each including a body;
   each body having a front and a back end defining a longitudinal axis therebetween and having a channel extending longitudinally therethrough parallel to said axis, each body further including:
   a tubular holder mounted within said channel having a lens seat adjacent said front end of said body;
   a lens positioned within said lens seat;
   a transmission means, having a front end, mounted within said holder with said front end adjacent said lens,
   and a first spring operatively arranged within said holder to urge said front end of said transmission means towards said lens;
   and means on the front end of each of said bodies adapted to cooperatively mate with each other and to retain said bodies with said channels in axial alignment;
   said tubular holder being movable relative to said body to urge said lens towards said front end of said body.

2. A connector according to claim 1 further including a second spring operatively arranged between each said body and said holder to urge said holder and said lens towards said front end of said body.

3. A connector according to claim 1, wherein said front end of one connecting part includes a guide sleeve and the other connecting part includes a guide, said guide being insertable within said guide sleeve to provide alignment of said transmission means between said connecting parts.

4. A connector according to claim 1, wherein said transmission means is replaceable.

5. A connector according to claim 1, wherein the first fiber optic transmission means is removably positioned within one of said bodies and the second fiber optic transmission means is removably positioned within the other of said bodies.

6. A connector according to claim 1, wherein said lens is fixedly secured in said lens seat.

7. A connector according to claim 6, wherein said lens seat has an opening therein and said first spring is adapted to urge said front end of said transmission means to bear on said lens seat adjacent said opening.

8. A connector according to claim 1 wherein each said body includes a ledge within said channel and said tubular holder includes a first shoulder that bears on said ledge.

9. A connector according to claim 8 wherein each said tubular holder has a second shoulder and said transmission means includes a peripheral flange that bears on said second shoulder.

10. A multi-channel connector for housing fiber optic transmission means, comprising:
   a body having a front and a back end defining a longitudinal axis therebetween and having a channel extending longitudinally therethrough parallel to said axis;
   a holder mounted within said channel having a lens seat adjacent said front end of said body;
   a lens positioned within said lens seat; and
   a transmission means having a front end mounted within said holder adjacent said lens;
   wherein said holder is movable within said channel for urging said lens towards said front end of said body; and
   wherein said transmission means is movable independent of said holder for urging the transmission means towards said lens.

* * * * *